(12) United States Patent
Sawal et al.

(10) Patent No.: US 12,086,645 B2
(45) Date of Patent: Sep. 10, 2024

(54) SYSTEM AND METHOD FOR CAPACITY MANAGEMENT IN DISTRIBUTED SYSTEM

(71) Applicant: Dell Products L.P., Round Rock, TX (US)

(72) Inventors: Vinay Sawal, Fremont, CA (US); Ramya Ramachandran, Hopkinton, MA (US); Mahendaran Pagalpatti Vijayakumar, Chennai (IN); Ashok Kumar Janardhana, Chennai (IN); Udhaya Chandran Shanmugam, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 500 days.

(21) Appl. No.: 17/579,210

(22) Filed: Jan. 19, 2022

(65) Prior Publication Data

US 2023/0229516 A1 Jul. 20, 2023

(51) Int. Cl.
*G06F 9/50* (2006.01)
*G06F 11/34* (2006.01)
*G06N 3/04* (2023.01)

(52) U.S. Cl.
CPC .......... *G06F 9/5055* (2013.01); *G06F 9/5038* (2013.01); *G06F 11/3409* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 7,676,812 B2 * | 3/2010 | Cabrera | H04L 9/40 719/318 |
| 7,764,773 B2 * | 7/2010 | Haumont | H04M 15/88 379/114.19 |

(Continued)

OTHER PUBLICATIONS

Austin House "InfraSolution" Catalog, published by Austin Hughes Electronics Ltd. on Nov. 29, 2020; available online at http://web.archive.org/web/20200810192944/https://www.austin-hughes.com/resource_cat/product-resources/rack-access-resources/.

(Continued)

*Primary Examiner* — Van H Nguyen
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources and software resources to provide the desired computer implemented services. To improve the likelihood of the computer implemented services being provided, the managed devices may be managed using a subscription based model. The subscription model may utilize a highly accessible service to facilitate system management. To facilitate system management, the highly available service may take into account both historic use of managed systems and changes to subscriptions to ascertain point in time when subscription limits may be reached. The identified points in time may be used to drive management decisions.

20 Claims, 9 Drawing Sheets

(56) References Cited

U.S. PATENT DOCUMENTS

| | | | |
|---|---|---|---|
| 8,782,192 B2* | 7/2014 | Morgan | G06F 11/3072 709/223 |
| 8,959,221 B2* | 2/2015 | Morgan | G06Q 30/04 709/201 |
| 9,125,050 B2 | 9/2015 | Taylor et al. | |
| 9,864,417 B2 | 1/2018 | Bermudez Rodriguez et al. | |
| 2002/0093785 A1 | 7/2002 | Chi et al. | |
| 2003/0111436 A1 | 6/2003 | Basinger et al. | |
| 2003/0229674 A1* | 12/2003 | Cabrera | H04L 67/535 709/229 |
| 2009/0059812 A1 | 3/2009 | Chinnaswamy et al. | |
| 2009/0293136 A1 | 11/2009 | Capmbell et al. | |
| 2010/0277866 A1 | 11/2010 | Chen | |
| 2011/0211465 A1 | 9/2011 | Farrugia et al. | |
| 2011/0241833 A1 | 10/2011 | Martin et al. | |
| 2015/0086017 A1 | 3/2015 | Taylor et al. | |
| 2015/0186677 A1 | 7/2015 | Sankar et al. | |
| 2017/0094827 A1 | 3/2017 | Wilson et al. | |
| 2017/0264509 A1 | 9/2017 | Wanser et al. | |
| 2018/0324027 A1 | 11/2018 | Kondapi et al. | |
| 2019/0069436 A1 | 2/2019 | Norton | |
| 2019/0174651 A1 | 6/2019 | Crawford et al. | |
| 2019/0384376 A1 | 12/2019 | Mathews et al. | |
| 2020/0057686 A1 | 2/2020 | Huang et al. | |
| 2020/0100383 A1 | 3/2020 | Hershey et al. | |
| 2022/0132317 A1* | 4/2022 | Robert | H04W 12/63 |
| 2022/0151114 A1 | 5/2022 | Heydari | |
| 2022/0407455 A1 | 12/2022 | Conti et al. | |

OTHER PUBLICATIONS

Wikipedia "Path MTU Discovery" Article, published by Wikipedia on Nov. 19, 2021; available Online at http://web.archive.org/web/20211119214201/https://en.wikipedia.org/wiki/Path_MTU_Discovery.

Tripplite "Rack Basics: Everything You Need to Know Before You Equip Your Data Center" Article, published on May 15, 2021; available online at http://web.archive.org/web/20210515085036/https://www.tripplite.com/support/rack-cabinet-basics-selection-installation-cooling.

* cited by examiner

SYSTEM AND METHOD FOR CAPACITY MANAGEMENT IN DISTRIBUTED SYSTEM

FIELD DISCLOSED HEREIN

Embodiments disclosed herein relate generally to system management. More particularly, embodiments disclosed herein relate to systems and methods to identify when subscription limits are likely to be reached.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
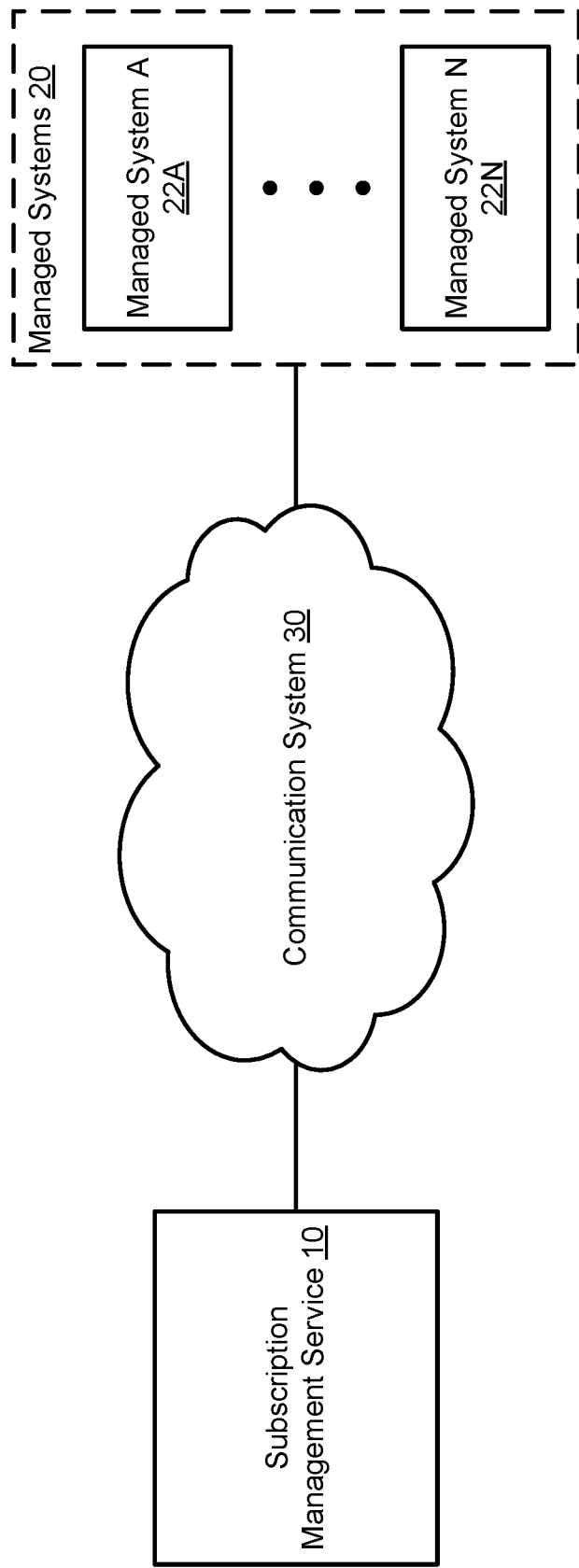
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services.

To improve the likelihood of the computer implemented services being provided, embodiments disclosed here relate to methods and systems for managing managed systems using a subscription based model. The subscription model may utilize a highly accessible service to obtain information regarding desired capabilities (e.g., a subscription) of a managed system, use the acquired information to automatically configure and manage the features and capabilities of managed systems to meet those desired by users, operators, and/or other persons, and facilitate usage based management of the managed systems.

To facilitate usage based management of the managed systems, a subscription management service may predict when subscriptions for use of managed systems are likely to be exceeded by a user. The predictions may be based on historical use of managed systems by the user and historical changes to subscriptions made by the user. Consequently, the predictions generated and used to manage the managed systems may take into account both use of the managed systems and likely future changes to subscriptions that will be made.

If it is determined that a subscription is likely to be exceeded, the system may automatically take steps to reduce the impact of or otherwise prevent the exceeded subscription from negatively impacting the user. For example, the system may automatically suggest, obtain consent for, and implement subscription changes. The subscription changes may reduce the likelihood of the subscription from being exceeded.

By doing so, the managed systems may be more likely to be able to provide the computer implemented services actually desired by users over time without interruptions in service due to subscription limits being reached when not desired or expected to be reached.

In an embodiment, a computer-implemented method for managing a distributed system comprising managed systems and a subscription manager that manages operation of the managed systems is provided. The method may include obtaining, by the subscription manager, use data and subscription changes for a first period of time, the use data reflecting use of a managed system of the managed systems by a user that is subscribed to use the managed system during a first period of time and the subscription changes reflecting changes in subscriptions to the managed system for the user during the first period of time; obtaining, by the subscription manager and using the use data, the subscription changes, and an inference model, a future use level of the managed system for a second period of time after the first period of time; making a determination, by the subscription manager, the that the future use level of the managed system indicates that a subscription limitation for the user will be reached during the second period of time; in response to the determination, performing, by the subscription manager and prior to the second period of time, an action set to reduce a likelihood that the subscription limitation will be reached; and providing, by the subscription manager and during the second period of time, computer implemented services to the user using the managed system and based on the subscribed to use of the managed system.

Obtaining the future use level may include generating a first prediction of future use of the managed system by the user during the second period of time; generating a second prediction of a future subscription limitation, the future subscription limitation being a prediction of a modification to the subscription limitation that will occur prior to the second period of time; and obtaining the future use level using the first prediction and the second prediction.

Making the determination may include making a comparison between the future use of the managed system and the future subscription limitation, the comparison indicating that the future use will exceed the future subscription limitation; and determining that the subscription limitation will be reached during the second period of time based on the comparison.

The action set may include presenting a subscription modification to the user, the subscription modification being based on the future use level; obtaining consent from the user for the presented subscription modification; and updating operation of the managed system based on the subscription modification, the computer implemented services being provided using updated functionality of the managed system.

The updated functionality may include automatic disablement of use of the computer implemented services by the user based on the subscription modification.

The subscription modification may indicate that the user is authorized to utilize more resources of the managed system than was authorized to utilize during the first period of time.

The future subscription limitation may indicate that the user will be authorized to utilize more resources of the managed system than was authorized to utilize during the first period of time but less than indicated by the future use of the managed system.

The inference model may include a machine learning model. The machine learning model is based on a Bayesian neural network.

The use data may be obtained from an out-of-band management controller hosted by the managed system, the out-of-band management controller managing functionality of the managed system accessible by the user and being tasked with implementing at least a portion of the action set. The out-of-band management controller may operate independently from the managed system.

The subscription changes may be automatically implemented by the out-of-band management controller by perform at least one of: disabling an enabled hardware component of the managed system; enabling a disabled hardware component of the managed system; and implementing a different software stack on the managed system.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
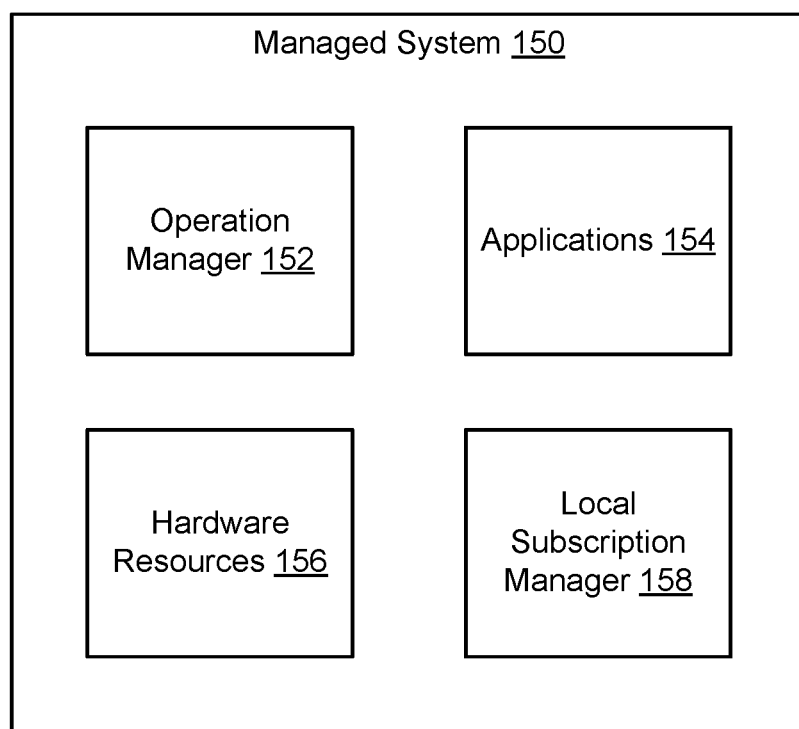
FIG. 1B shows a block diagram illustrating a managed system in accordance with an embodiment.

To provide the aforementioned computer implemented services, any of managed systems 22A, 22N may need to operate in a predetermined manner. For example, certain hardware components may need to be operational and/or certain software components (e.g., applications) may need to be operating for the managed systems to provide computer implemented services (e.g., to operate as a solution). Different configurations of the hardware components and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services. To do so, a system in accordance with embodiments disclosed herein may provide a distributed system for automatically identifying and implementing hardware and/or software configurations of managed systems to support desired computer implemented services. By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services. For example, users of managed systems may identify their likely available capacity and/or use in the future and modify their subscriptions to avoid overages or incremental cost by ensuring that their subscriptions cover their likely use of managed systems in the future.

To provide the above noted functionality, a system in accordance with an embodiment may include subscription management service 10. Subscription management service 10 may facilitate automatic configuration of managed systems 20. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) correlate the desired functions with various hardware components (e.g., if explicit hardware components identifications are not made) and/or software components, and (iii) provide local subscription managers hosted by managed systems 20 with information regarding the identified hardware components, software components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may configure managed systems 20 without needing to directly interact with the various hardware and/or software components of managed systems 20.

Further, the distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. The contractual basis may be, for example, durations of time, use of certain quantities of resources such as processor cycles, storage space, etc. and/or aggregate services provided by one or more managed systems.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

To enable clients to effectively manage financial cost, available capacity, and/or other features provided through managed systems 20, subscription management service 10 may provide information regarding the use of managed systems 22A-22N, information regarding current subscriptions such as various limitations with respect to the subscriptions, alerts or notifications when subscription limitations and/or use of the managed systems indicate that the client may desire to make changes to their subscriptions, and/or other types of information usable by clients to manage their respective uses of managed systems 20. For example, subscription management service 10 may provide graphical user interfaces to user of clients to allow the clients to (i) modify their subscriptions, (ii) pre-authorize changes in subscriptions, and/or (iii) otherwise facilitate communications between user of clients and subscription management service 10. By doing so, users of managed systems 20 may, through such interfaces, dynamically manage their subscriptions as their use of managed systems 20 changes over time.

For example, consider a scenario where a business organization contracts with a company to receive database services to manage sales data. A user from the business organization (e.g., an internet technology manager or other person) may use the interfaces provided with subscription management service 10 to elect to receive database services. Based on the subscription election for database services, subscription management service 10 may automatically select and configure all, or a portion, of managed system 20 to provide the database services by, for example, (i) enabling/disabling hardware devices of managed systems 20, (ii) load and/or remove various applications, firmware, and/or other types of software, (iii) apply configuration settings to hardware devices and/or software, and/or (iv) perform other types of actions to facilitate provisioning of the database services.

Once the database services are being provided, managed systems 20 may report use of the database services to subscription management service 10. Doing so, may allow subscription management service 10 to notify the business organization of their use of the services (e.g., which may incur financial cost and may require modifications in subscription to manage cost), approaching limits (e.g., transaction rate limits based on elected subscriptions, storage space limits based on elected subscription, etc.), and/or reached limits that are impacting the quality of the services received by the business organization.

However, due to the use of a subscription based model, each subscribing entities relative use of their subscribed to features, capacity, etc. may dynamically change over time. For example, a subscribed entity may initial request that storage for ten gigabytes of data be provided. The subscribed entity may, at later points in time change the subscribed to capacity of ten gigabytes to larger or smaller amounts based on, for example, changes in business use, to obtain cost savings, periodically over time as the needs of the subscribed entity change, and/or for other reasons. For example, if a user has used nine out of ten gigabytes of storage space, and the user changes its subscription to twenty gigabytes, the user may no longer be at risk of reaching the limits of its subscription after the dynamic change in subscription. Consequently, the relative utilization level of a subscription may change over time even when little use of managed systems is taking place. Further, because a user may have elected into any number of subscriptions, and the subscriptions may interact in unexpected or anticipated manners, it may be challenging to determine based on current subscriptions and use data whether it is likely that the user will exceed subscription limitations in the future.

If a user is unable to ascertain whether they are likely to reach a subscription limit in the future, the user may do so unintentionally. When a subscription limit is reached, any number of undesirable outcomes may occur if the subscription limit is unintentionally reached. For example, reaching the subscription limit may deprive the user of further use of the subscribed to features, services, capacity, etc., may cause the user to be subject to incremental cost (e.g., in a scenario where a user has agreed to incur cost based on use overages outside of that subscribed to by the entity), etc.

To reduce the likelihood of subscription limitations being unintentionally reached, subscription management service 10 may utilize one or more inference models. The inference models may estimate whether a user is likely to reach a subscription limit at future periods of time. The inference model may take into account the current and/or past subscribed to use of services by users, as well as historical information regarding changes in subscriptions that may enhance and/or reduce subscribed to use capacity of the managed sytems. By taking into account this information, the estimates may be more accurate when compared to estimates regarding reaching subscription limitation in the future that only take into account use of the managed systems without the dynamic changes made to corresponding subscriptions. For additional details regarding subscription management service 10, refer to FIG. 1D.

By doing so, embodiments disclosed herein may provide a distributed system management model that is more likely to provide desired services to user by improving the likelihood that the user is aware of the likelihood of reaching subscription limitations in the future. Doing so may allow the user to take proactive action to ensure that the subscription limits are not reached, if so desired by the user. Consequently, the disclosed distributed systems may be more likely to ensure that desired services are provided even while use of and subscriptions for managed systems dynamically change over time.

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10 and managed systems 20 are operably connected via communication system 30. Communication system 30 may allow any of subscription management service 10 and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

Figure 5:
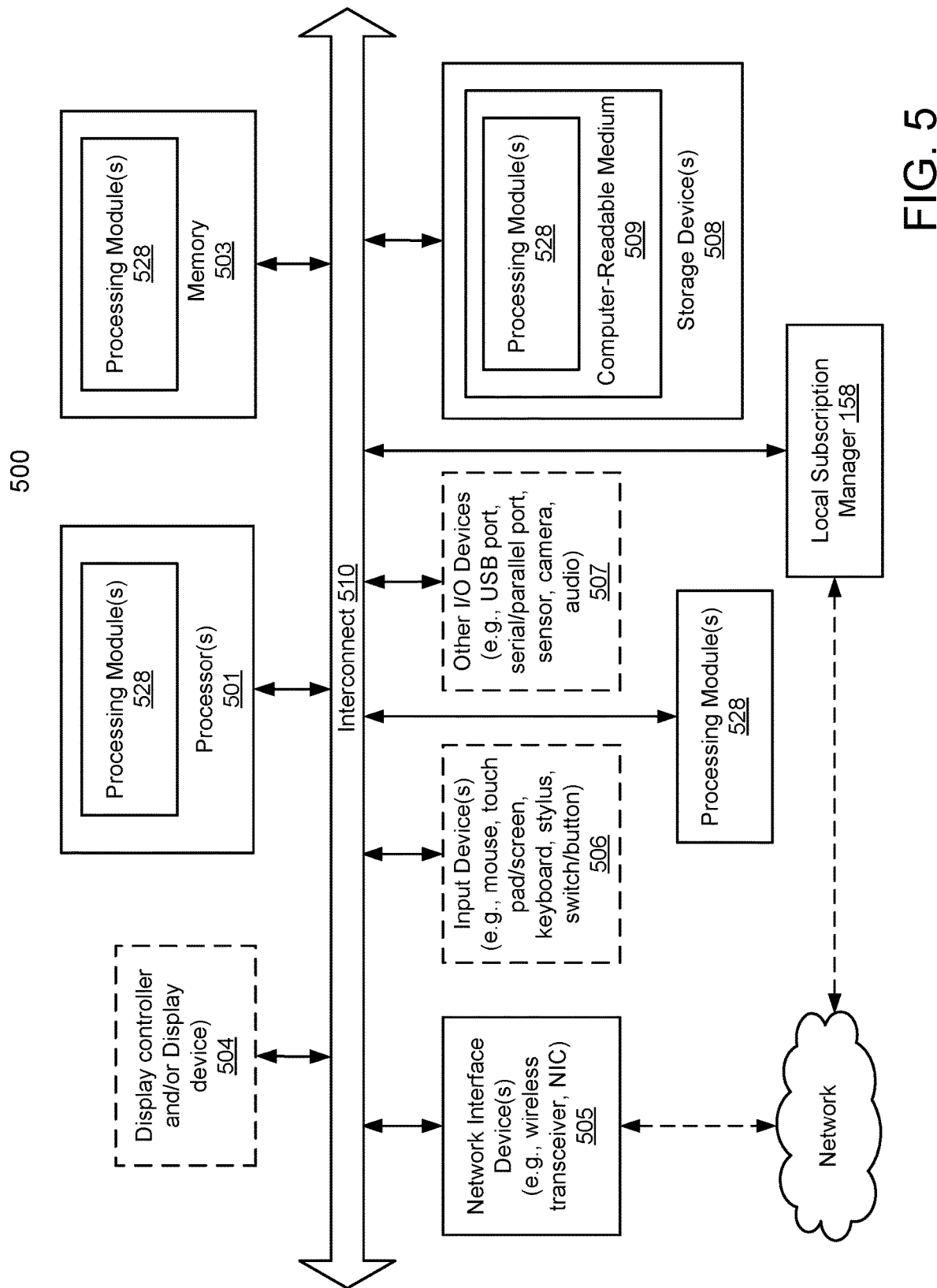
FIG. 5 shows a block diagram illustrating a computing device in accordance with an embodiment.

In addition (and/or alternatively) to any of the components shown in FIG. 5, managed system 150 may include operation manager 152, applications 154, hardware resources 156, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system or other type of operation management entity. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities).

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions) to obtain, for example, use data, (v) providing use data to the subscription management service, and (vi) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activing various deactivated hardware resources, (b) loading various information into storage and/or memory of managed system 150, (c) causing processors or other devices of hardware resources 156 to execute various code blocks to cause them to perform certain operations, and/or (d) any other types of actions to implement changes to managed system 150 to comply with a subscription. Likewise, the one or more actions to force managed system 150 to comply with the subscriptions may include (I) disabling various activated hardware resources, (II) removing various information from storage and/or memory of managed system 150, (III) causing processor or other devices of hardware resources 156 to execute other code blocks to cause them to perform certain operations to revert previous changes to the operation of managed system 150 and/or remove certain functionalities, and/or (IV) any other types of actions to implement changes to managed system 150 to comply with a subscription or lack thereof.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to disable/enable components, reconfigure components, add new components (e.g., load additional applications for execution), etc.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30.

Figure 1C:
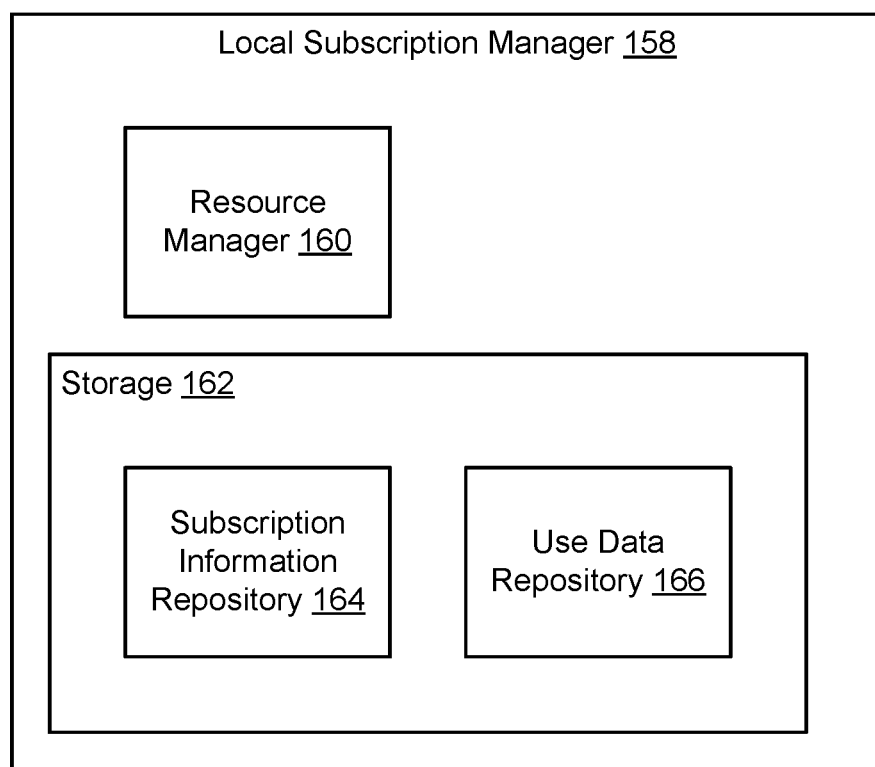
FIG. 1C shows a block diagram illustrating a local subscription manager in accordance with an embodiment.
Figure 2:
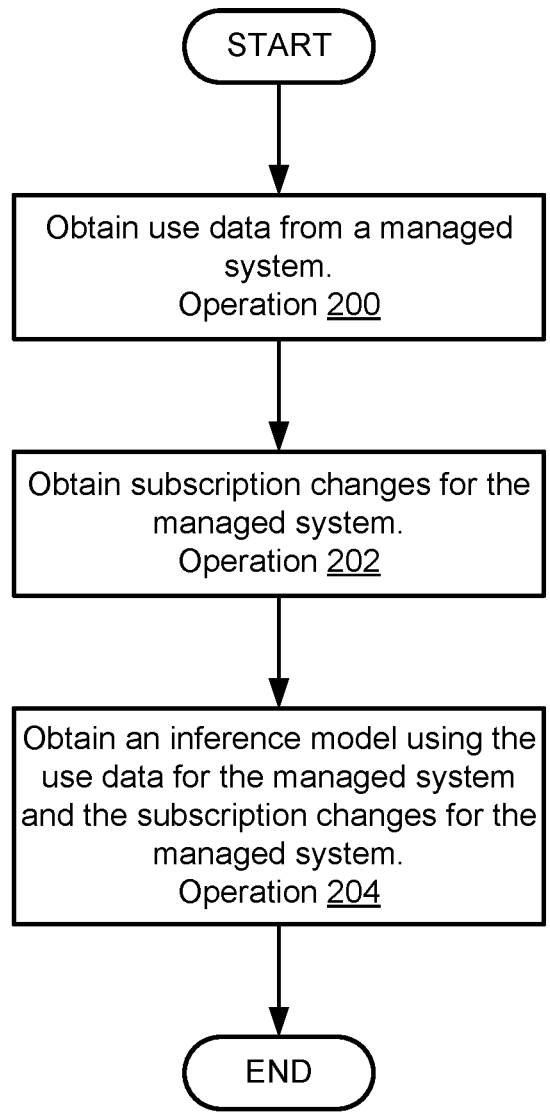
FIG. 2 shows a flow diagram illustrating a method of obtaining an inference model in accordance with an embodiment.
Figure 3:
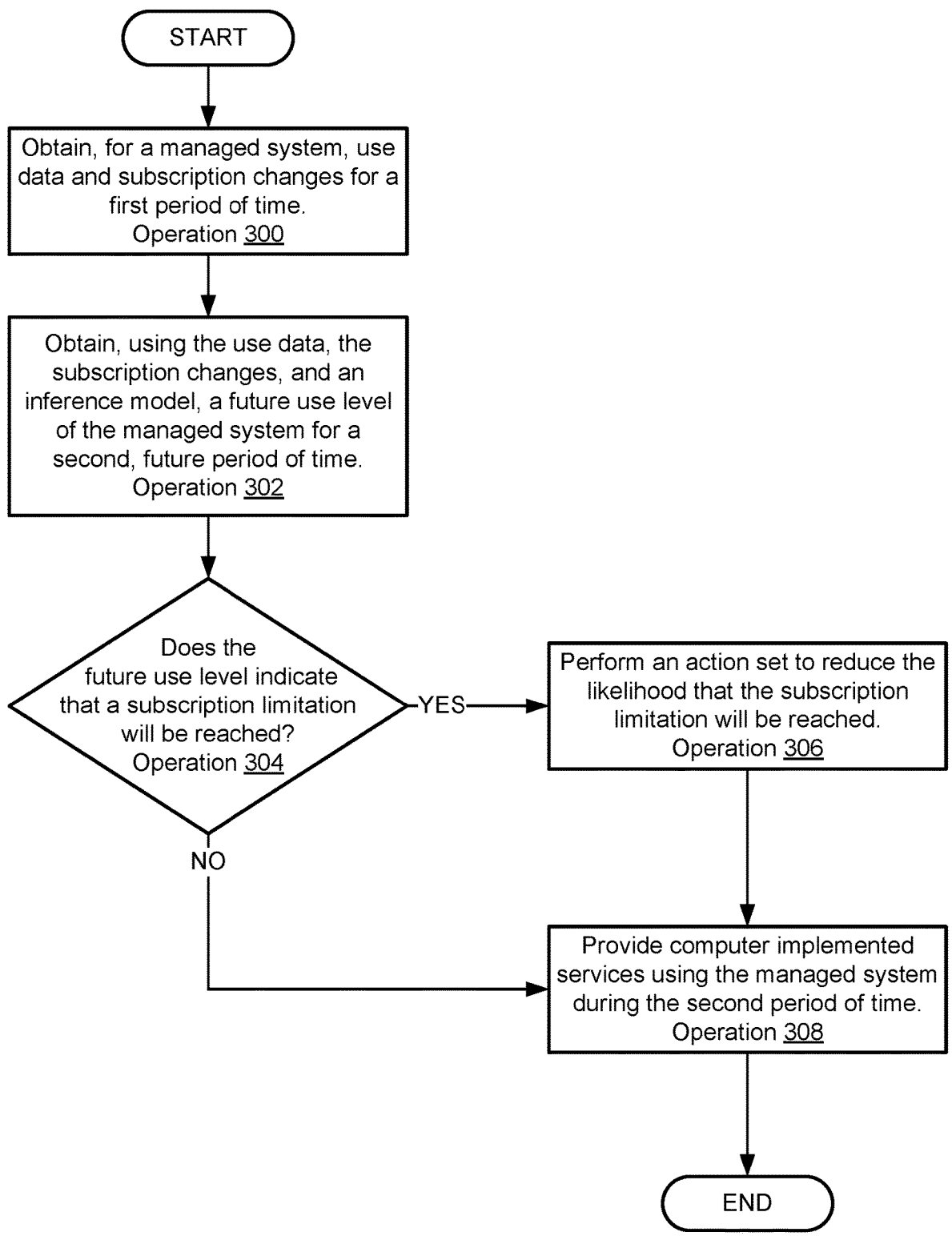
FIG. 3 shows a flow diagram illustrating a method of managing one or more managed systems in accordance with an embodiment.
Figure 4A:
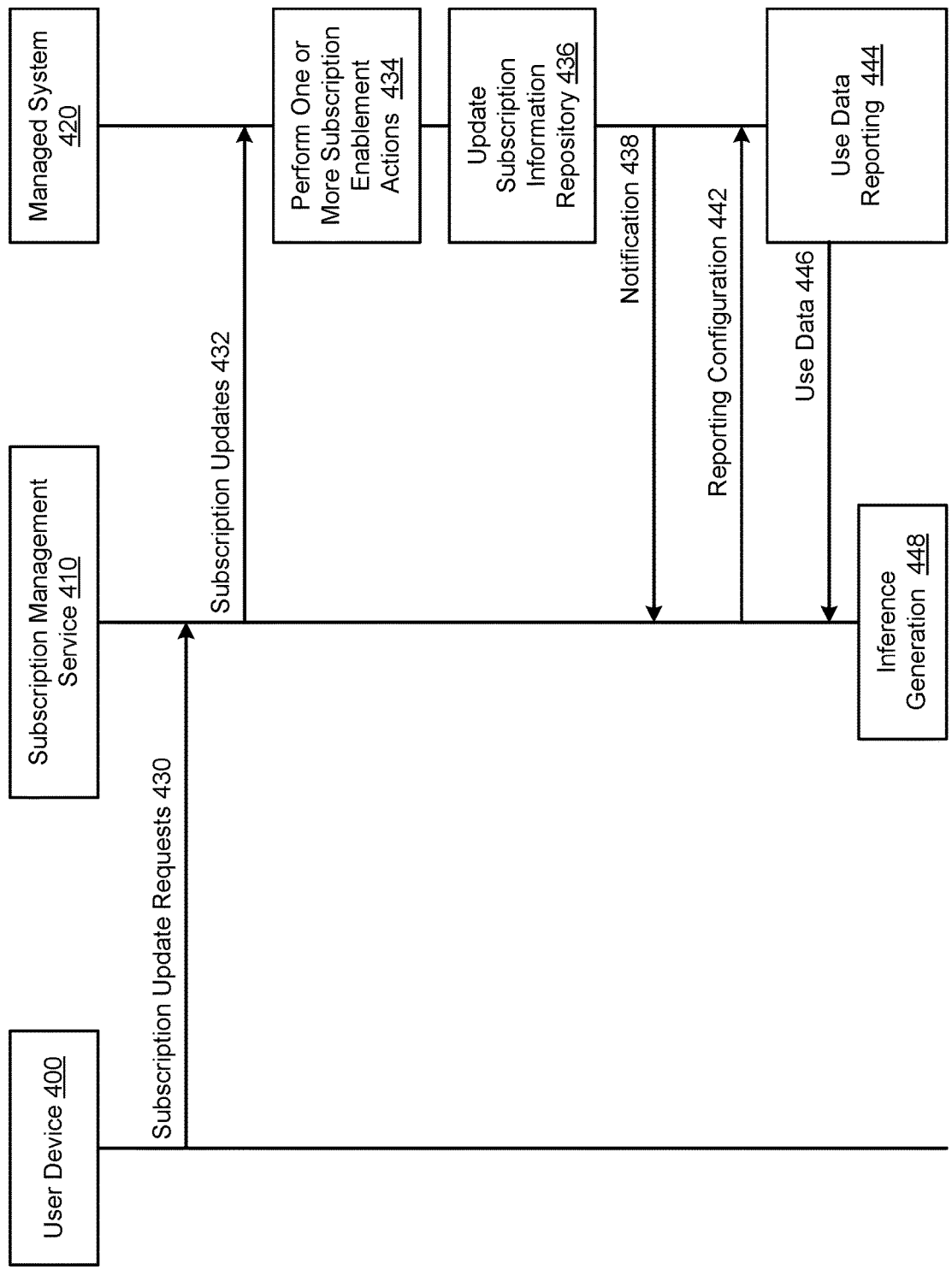
FIGS. 4A-4B show diagrams illustrating interactions between and actions of components of a system in accordance with an embodiment.
Figure 4B:
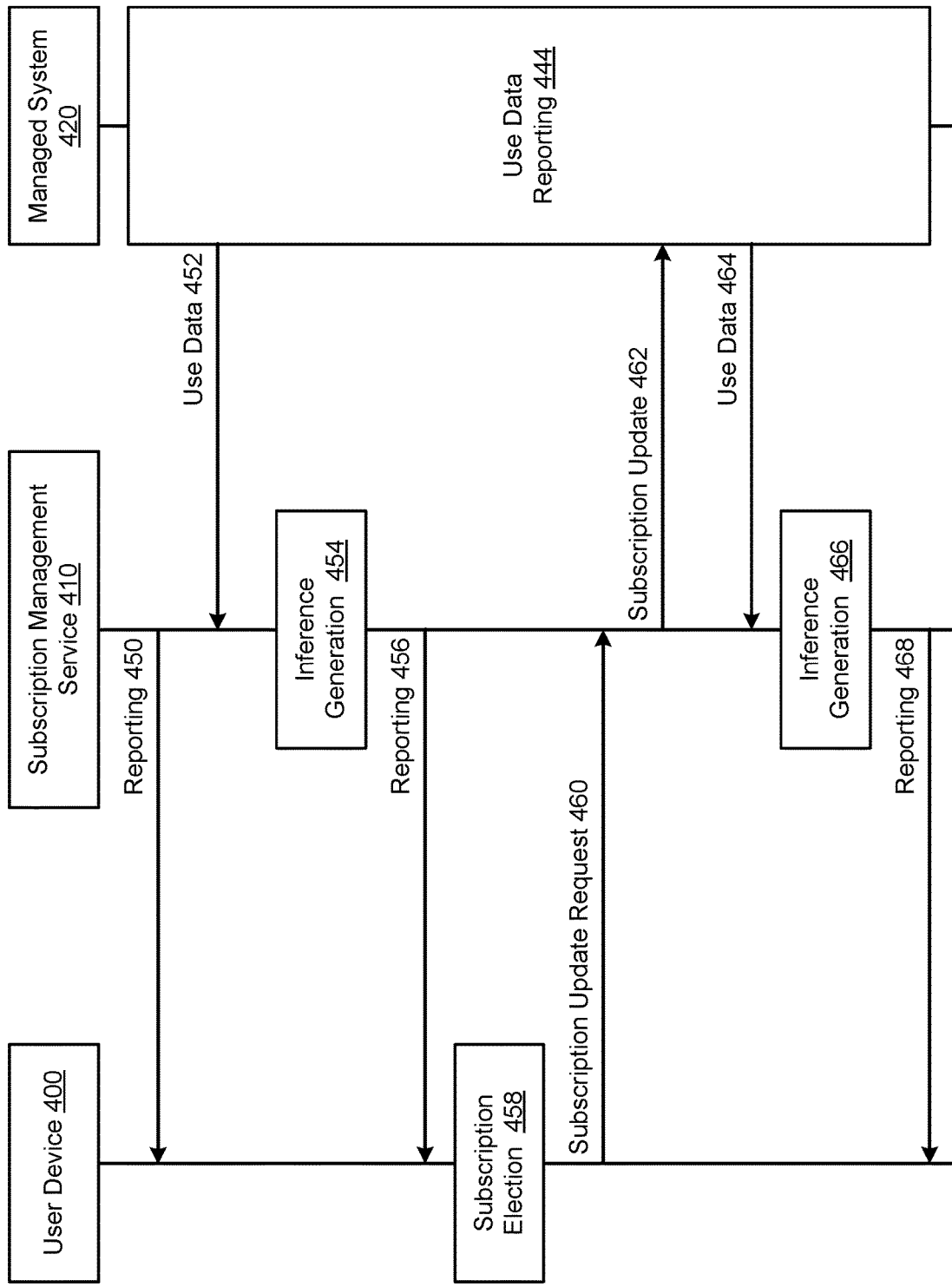

When providing its functionality, local subscription manager 158 may perform all, or a portion, of the methods and operations illustrated in FIGS. 2-3 and/or actions shown in and/or described with respect to FIGS. 4A-4B. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include resource manager 160 and storage 162. Each of these components is discussed below.

Resource manager 160 may include functionality to (i) establish secure connections with and/or authenticate subscription management service 10, (ii) obtain information from subscription management service 10 via the secure connections, (iii) update subscription information repository 164 based on the obtained information, (iv) modify the configuration, function, and/or operation of a managed system that hosts local subscription manager 158 to conform to the information stored in subscription information repository 164, (v) monitor use of subscribed to services provided by the host managed system, and (vi) report the use of such services provided by the host managed system to the subscription management system.

In an embodiment, resource manager 160 is implemented using a hardware device including circuitry. The hardware device may be, for example, a digital signal processor, a field programmable gate array, or an application specific integrated circuit. The circuitry may be adapted to cause the hardware device to perform the functionality of resource manager 160. Resource manager 160 may be implemented using other types of hardware devices without departing embodiment disclosed herein.

In one embodiment, resource manager 160 is implemented using a processor adapted to execute computing code stored on a persistent storage that when executed by the processor performs the functionality of resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a managed system that hosts local subscription manager 158.

Storage 162 may store data structures including subscription information repository 164 and use data repository 166. Each of these data structures is discussed below.

Subscription information repository may be implemented with one or more data structures that store information regarding subscriptions for a device that hosts local subscription manager 158. The information may allow resource manager 160 to enforce various configurations on a host managed system to conform that operation of the host managed system to meet subscription limitations. For example, subscription information repository 164 may include code blocks usable to force a host managed system (e.g., by initiating execution of the code blocks) to enable/disable various hardware components, software components, adopt various configurations, and/or otherwise conform its operation to that necessary for desired computer implemented services to be provided. Such actions may be invoked when corresponding subscription limits are reached.

Use data repository 166 may be implemented with one or more data structures that store information regarding use of the services provided by the host managed system. The use data may include quantities of services utilized by a user (e.g., absolute quantities, use rates, and/or other types of information regarding use of such services by subscribed entities), quantities of computing resources consumed by services provided to a user, and/or other information usable to quantify use of a host managed system or services provided by the host managed system. The information included in use data repository 166 may be maintained by resource manager 160 which may monitor the operation of a host managed system to obtain the information. The information may be reported to a subscription management service, and also may be used to ascertain whether subscription limits have been reached. However, by virtue of the dynamically changing nature of subscription limitations, it may be difficult to ascertain whether a subscription limit will be reached based on current use data.

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Figure 1D:
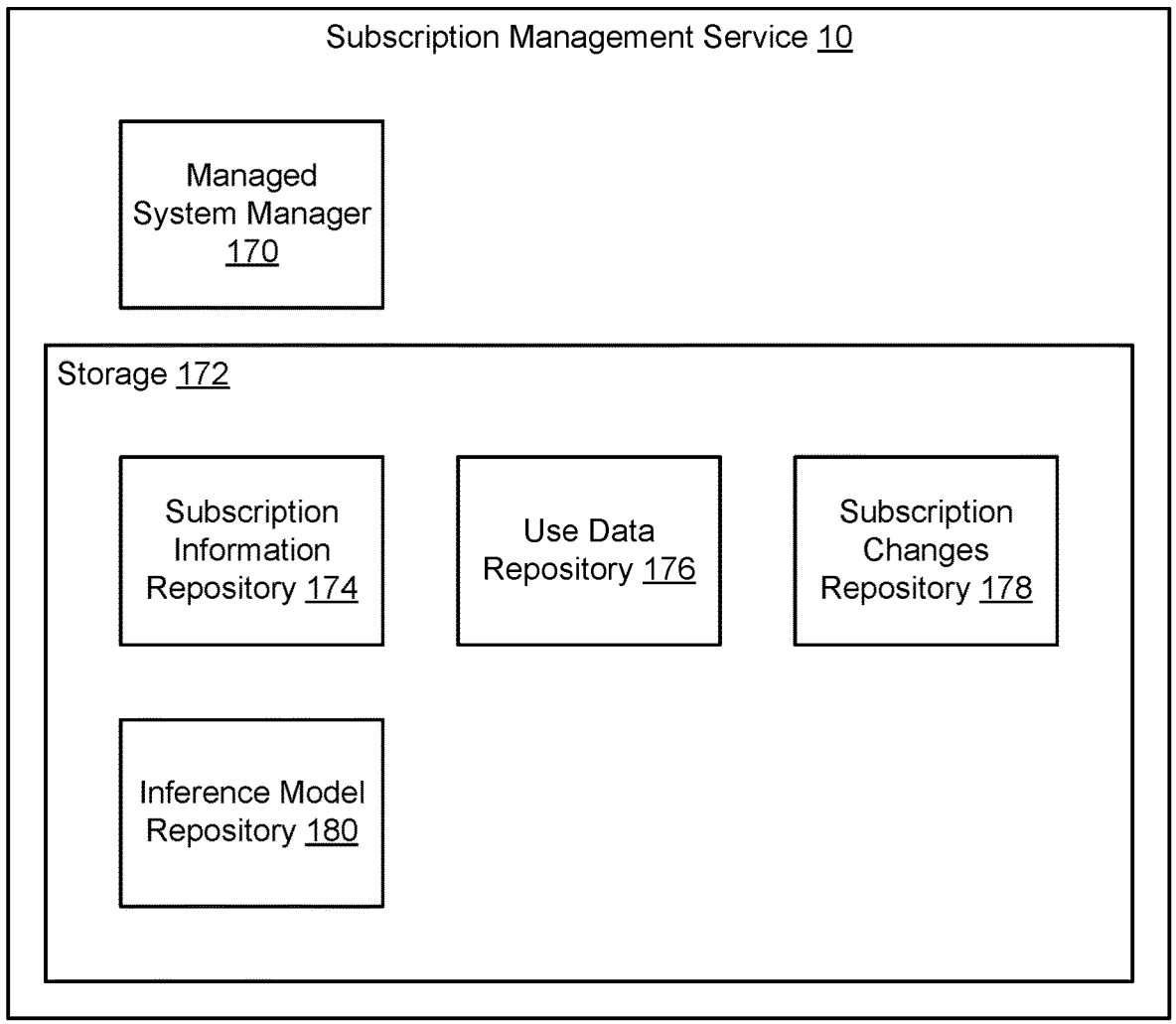
FIG. 1D shows a block diagram illustrating a subscription management service in accordance with an embodiment.

Turning to FIG. 1D, a block diagram of subscription management service 10 in accordance with an embodiment is shown. As discussed above, subscription management service 10 may manage the operation of managed systems based on subscriptions. To provide its functionality, subscription management service may include managed system manager 170 and storage 172. Each of these components is discussed below.

Managed system manager 170 may include functionality to (i) obtain subscription information for various users of managed systems (e.g., an use the subscription information to managed various managed systems), (ii) provide information regarding use of the managed systems by the user to the users, (iii) provide the users of the managed systems information regarding their use of the managed systems and/or limitations thereof, and/or (iv) automatically and/or at the direction of user of managed systems, modify subscriptions for the users to improve the likelihood that the managed systems provide computer implemented services desired by user of the managed systems.

To provide information regarding use of managed systems to the users, managed system manager 170 may use inference models to estimate likely future use and future subscription limitations. The future use and future subscription limitations may be used to estimate if and/or when a subscription limitation (which may be modified in the future) will be reached in the future.

The inference models may be stored in inference model repository 180. The inference models may be usable to infer the likelihood of subscription limits being violated in the future. For example, the inference models may take use data from earlier periods of time and changes to subscriptions during the earlier periods of time as input and output inferred likelihood of subscription limits being reached.

Managed system manager 170 may use the inferred likelihood of subscription limits being reached to proactively inform users of the managed system ahead of subscription limits actually being reached. For example, when it is inferred that a subscription limit is likely to be reached in the future, managed system manager 170 may automatically notify the corresponding user of one or more of: (i) likely quantities of use of managed systems, (ii) likely subscription limits on the use of the managed systems, and (iii) one or more subscription options (e.g., changes) that may reduce the likelihood of the subscription limit being reached. For example, in a scenario where a data storage subscription limitation is likely to be reached, managed system manager 170 may present options for expanding the subscribed to storage capacity. If a user elects (e.g., by selecting a widget or other interface element) the presented subscription option, then managed system manager 170 may automatically update subscription information repository 174 and implement the change in subscription. Doing so may reduce the likelihood of the subscription limit being reached. Consequently, the user may continue to utilize the managed systems even after the original subscription limit had been reached (e.g., which may not have been changed absent prompting/notification by managed system manager 170).

When providing its functionality, managed system manager 170 may perform all, or a portion of the methods of FIGS. 2-3 and/or the actions illustrated in and/or described with respect to FIGS. 4A-4B.

In an embodiment, managed system manager 170 is implemented using a hardware device including circuitry. The hardware device may be, for example, a digital signal processor, a field programmable gate array, or an application specific integrated circuit. The circuitry may be adapted to cause the hardware device to perform the functionality of managed system manager 170. Managed system manager 170 may be implemented using other types of hardware devices without departing embodiment disclosed herein.

In one embodiment, managed system manager 170 is implemented using a processor adapted to execute computing code stored on a persistent storage that when executed by the processor performs the functionality of managed system manager 170 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 172 is implemented using physical devices that provide data storage services (e.g., storing data and providing copies of previously stored data). The devices that provide data storage services may include hardware devices and/or logical devices. For example, storage 172 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 172 may include a memory device (e.g., a dual in line memory device) in which data is stored and from which copies of previously stored data are provided. In another example, storage 172 may include a persistent storage device (e.g., a solid-state disk drive) in which data is stored and from which copies of previously stored data is provided. In a still further example, storage 172 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 172 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 172 may store data structures including subscription information repository 174, use data repository 176, subscription changes repository 178, and inference model repository 180. Each of these data structures is discussed below.

Subscription information repository 174 may be implemented with one or more data structures that store information regarding subscriptions agreed to by various users. For example, subscription information repository 174 may indicate (i) agreed to subscriptions, (ii) agreed to changes in subscriptions upon the occurrence of corresponding conditions (e.g., subscription limits being reached), (iii) limitations on the subscriptions, and/or (iv) other information regarding subscriptions for user of managed systems.

Use data repository 176 may be implemented with one or more data structures that store information regarding use of the services provided by one or more managed systems to users (e.g., that have agreed to various subscriptions for such use). The use data may include quantities of services utilized by a user (e.g., absolute quantities, use rates, and/or other types of information regarding use of such services by subscribed entities), quantities of computing resources consumed by services provided to a user, and/or other information usable to quantify use of managed systems or services provided by the managed systems.

Subscription changes repository 178 may be implemented with one or more data structures that store information regarding changes in subscriptions for various users. For example, the repository may include time-subscription change relationships such that a time series of changes in subscriptions and/or information regarding the impact of the changes in subscription may be formed. Consequently, the effective subscribed to use capacity for each user over time (e.g., the past) may be determined using the information included in subscription changes repository.

Inference model repository 180 may be implemented with one or more data structures that store information regarding inference models usable to obtain inferences regarding whether subscription limits will likely be reached by various users. The inference model repository 180 may include any quantity and type of inference models. The inference models may include, for example, predictive models obtained using regression analysis, trained machine learning models, and/or other types of predictive models.

In an embodiment, at least one of the trained machine learning models is based on a Bayesian neural network machine learning model. The Bayesian neural network machine learning model may be trained using a data set (e.g., training data) that relates use data and effective use capacity available to a user during a first period of time to use data and effective use capacity during a second period of time (e.g., after the first period of time). Once trained, the Bayesian neural network machine learning models may be able to generate inferences of the use data and effective capacity during later periods of time based on use data and effective capacity (e.g., based on subscription changes) during earlier periods of time. Consequently, the trained Bayesian neural network machine learning models may be capable of generating inferred use data and effective capacity available to users for future periods of time. The Bayesian neural network machine learning models may be trained using information included in use data repository 176, subscription changes repository 178, and/or other locations. Managed system manager 170 or another entity may train the Bayesian neural network machine learning models.

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to subscription management service 10 (e.g., in a cloud resource, etc.) in a manner that is still accessible to subscription management service 10.

While illustrated in FIG. 1D with a limited number of specific components, a local subscription manager may include additional, fewer, and/or different components without departing from embodiments disclosed herein.

As discussed above, the components of FIG. 1A may perform various methods to provide computer implemented services using managed systems. FIGS. 2-3 illustrate examples of methods that may be performed by the components of FIG. 1A. For example, a subscription management service may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of obtaining an inference model in accordance with an embodiment is shown.

At operation 200, use data from a managed system is obtained. The use data may be obtained via one or more messages (or other communication method). To obtain the use data, a subscription management service may indicate to a local subscription manager of the managed system (e.g., that host the local subscription manager) to monitor and/or report use of various aspects of the operation of the managed system by corresponding subscribed users.

Once obtained, the use data may be stored in a use data repository. Any quantity of use data may be obtained. For example, use data corresponding to various periods of time may be obtained. The use data may correspond to one or more users, one or more subscriptions agreed to by the one or more users, and/or may be obtained from one or more managed systems (e.g., a subscription may be serviced using multiple managed systems).

At operation 202, subscription changes for the managed system are obtained. The subscription changes may be obtained from a repository. The repository may track subscription changes (e.g., and the impact on the effective use limits to users of the managed system) for users of the managed system. The subscription changes may be obtained by reading them from the repository.

At operation 204, an inference model is obtained using the use data for the manage system and the subscription changes for the managed system. In an embodiment, the inference model is obtained by training or otherwise using the user data and subscription changes to adapt the inference model to generate inferences regarding use and effective use capacity for each user at points in time based on use and effective capacity of the managed systems at other points in time. The effective capacity may be obtained based on the subscription changes (e.g., which may specify different use limits that define the effective use capacity for each user, the user capacity being the subscription limit on use of the managed system).

In an embodiment, the inference model is implemented with a Bayesian neural network machine learning model. The Bayesian neural network may include any number of masking layers (e.g., that operate on input and generate modified inputs), any number of hidden layers (e.g., Bayesian neural network inference layers), and may generate any number of predictions (e.g., inferred use data).

For example, a multivariate time series input including known input (e.g., use data and effective capacity derived from subscription changes during a first time period) and output (e.g., use data and effective capacity during a second time period) may be formed. In some cases, some values in the multivariate time series may be missing. Such missing information may be inferred. In order to preserve the missing information a masking matrix $V_{nxm}$ may be used to represent the missing values in the input $V_{ij}=0$ when $X_{ij}$ is missing. A multi-step Bayesian RNN may be employed to predict the label Yhat. At every time step, input may be fed through the masking layer to a Bayesian RNN. The hidden state may be specified as $h_t=f(W_r, h_{t-1}, x_t)$, where $h_t$=RNN hiddle state at time step t. $W_r$ may be weights for the recurrent layer.

The input may generally equi-spaced, e.g., the time increments between data points may be equal (or substantially equal). In the event the input is not regularly sampled over time, a temporal decay factor may be incorporated in the hidden state to regularize the time-series.

To model the uncertainty in F, the Bayesian RNN may consider a probability distribution $p(W_r|D)$ for the weights, instead of fixed point values $W_r$. The missing features in $x_t$ may be augmented with predicted features from the previous layer's X prediction and described by $\hat{x}=g(U_x, h_{t-1}, x_t)$. G may implicitly model the correlation amongst features.

To model the uncertainty in G, a Bayesian fully connected NN may be utilized that considers a probabilistic distribution $p(U_x|D)$ for the weights $U_x$. After filling in missing values, hidden states may be computed at every time step and fed to the next time step denoted by $H=[h_1, h_2, \ldots, h_T]$. The final prediction Y may be a linear function of X predictions and H hidden layers specified as $Y=f(\hat{X}, H)$.

By computing the probabilistic distribution of the overall weights $W=[W_r, U_x]$ give the data set D, the inferred use data may be obtained. By setting the prior distribution p(W) for the weights as mixed Gaussian, the loss function may be defined to control the prediction and posterior distribution of the weights at the same time. By minimizing the cross-entropy loss function, the posterior of the weights as well as the output predictions as defined as Lpred=Lce(Yhat, Y) may be obtained.

The method may end following operation 204.

Operation 204 may be repeated any number of times to generate any number and type of inference model (e.g., other types of inference models may be generated thereby allowing for multiple inferred use data to be obtained, which may be used to refine the inferred use data and effective capacity through any type of mathematical optimization) may be obtained.

Turning to FIG. 3, a flow diagram illustrating a method of managing operation of a distributed system in accordance with an embodiment is shown. The method may be performed, in part or entirely, by a subscription management services and/or one or more managed systems.

At operation 300, use data and subscription changes for a first period of time are obtained. The use data may be obtained via one or more messages (or other communication scheme) from a managed system. The managed system may be managed based on one or more subscriptions to which a use has agreed. The subscription may define the computer implemented services and/or use of the managed systems by the user. The subscriptions may include one or more subscription limits that may limit use of the managed systems even though the managed systems are capable of providing more/additional services to the user.

The subscription changes may be obtained from a repository. For example, as changes are implemented, the subscription management service may track the changes and add information to the repository. As changes are made, the subscription management service calculate the effective use capacity for each of the user of the managed system. The effective use capacity may be multidimensional and define any number of limits on the use of the managed system. The limits may relate to resource consumption limits (e.g., for services), service use limits (e.g., number of times a service may be utilized, number of concurrent uses, etc.). The effective use capacity of managed system for each user may be tracked over time to generate a time-series similar to a time-series of the use of the managed system by the user. Consequently, multiple time-series for each of these quantities over the first period of time may be obtained.

At operation 302, a future use level of the managed system for a second, future period of time is obtained using the user data, the subscription changes, and an inference model. For example, one or more inference models may take the use data and subscription changes as input and generate the future use level as output. The future use level may indicate (i) a quantity of future use of the managed system by the user and (ii) an effective use capacity (e.g., allowed based on subscription limits) of the managed system for the user.

At operation 304, a determination is made regarding whether the future use level indicates that a subscription limitation will be reached (e.g., during the second period of time). The determination may be made by comparing the (i) a quantity of future use of the managed system by the user to the (ii) effective use capacity of the managed system for the user. If the quantity of future use meets or exceeds the effective use capacity (and/or does not exceed or meet but is within a range based on the effective use capacity) for the user, then it may be determined that the future use level indicates that the subscription limitation will be reached.

If it is determined that the future use level indicates that the subscription limitation will be reached, then the method may proceed to operation 306. Otherwise the method may proceed to operation 308 following operation 306. If the method proceeds to operation 306, the subscription management service may believe that the user is likely to lose access to desired computer implemented services during the second, future period of time if subscriptions for the user are not modified. If the method proceeds to operation 308, the subscription management service may believe that the user is unlikely to lose access to the desired computer implemented services during the second period of time if the subscriptions for the user are not modified.

At operation 306, an action set is performed to reduce the likelihood that the subscription limitation will not be reached. The action set may include one or more of (i) notifying the user of the likely loss in access (e.g., by presenting it in a graphical user interface), and/or subscription limitations, obtaining subscription elections from the user (e.g., prompted or responsive to the notification), and implementing the subscription elections to modify computer implemented services provided with the managed system, (ii) automatically implementing pre-authorized subscription elections based on the future use level (e.g., the future use level meeting a threshold or other condition indicating that the pre-authorized subscription elections are to be implemented), and implementing the subscription elections to modify the computer implemented services provided by the managed system, (iii) modifying or disabling a hardware component of the managed system, (iv) deploying a replacement software stack to the managed system, (v) initiating deployment of a hardware component to the managed system, (vi) migrating a workload associated with the user to a second managed system of the managed systems, and/or (vii) other types of actions that may reduce the impact or possibility of the user losing access to desired computer implemented services by virtue of subscription limitations.

At operation 308, computer implemented services are provided (e.g., to the user) using the managed system during the second period of time. The managed system may automatically provide the services by virtue of, for example, changes in subscriptions implemented in operation 306 or no changes in subscriptions if the no path following operation 304 is followed.

The method may end following operation 308.

Turning to FIGS. 4A-4B, example actions and interactions between user device 400, subscription management service 410, and managed system 420 in accordance with an embodiment are shown. Like named components in FIGS. 4A-B and FIG. 1A may be similar. Generally, operations performed by these components are illustrated as boxes positioned on the line descending from each of the boxes at the top of the respective page denoting each respective component. Interactions between the components are illustrated using arrow extending between the lines (or boxes positioned thereon) descending from each of the boxes at the top of the respective page denoting each respective components. Generally, actions/interactions may be temporally ordered with actions occurring earlier in time being higher on each page while actions occurring later in time being lower on the each. However, the actions may be performed in different temporal order without departing from embodiments disclosed herein.

User device 400 (e.g., a cell phone, laptop computer, tablet computer, etc.) may be a device utilized by a person tasked with managing managed system 420. To manage managed system 420, the user may provide, at block 430 and through user device 400, one or more subscription update requests to subscription management service 410. The user may do so via a webpage displayed on user device 400 and driven by subscription management service 410.

The subscription update requests may specify that database services are to be provided by managed system 420 with a limit of ten gigabytes of storage space. In response to receiving the subscription update request, at block 432, subscription management service 410 may generate and send subscription updates to managed system 420. The subscription update may specify, in part, an action (e.g., enablement action) to deploy appropriate software to provide the database services and dedicate ten gigabytes of storage space. Subscription management service 410 may also store information regarding subscription changes and calculate effective use capacities of managed system 420 for the user based on the subscription updates and/or requests. A time series may be formed using the effective use capacity of managed system 420 for the user.

While illustrated in FIG. 4A as occurring prior to other actions, the subscription update requests and subscription updates may occur at different times (e.g., such as partially concurrently with use data reporting of block 444, discussed below).

Managed system 420, in response to receiving subscription update and at block 434, may perform one or more subscription enablement actions such as powering a storage device, allocating ten gigabytes of storage, and deploying a database instance using the storage space. Managed system 420 may also, at block 436, update subscription information repository to reflect the ten gigabyte limit of the subscription (which may also indicate that use data for storing data in the database should be reported to subscription management service 10). For example, an entry specifying ten gigabytes of data for the user of user device 400.

Following the update of the subscription information repository, the local subscription manager of managed system 420 may monitor the operation of managed system 420 to identify if the subscription limit of gigabyte has been exceeded, report the measured use data regarding the storage space actually consumed to subscription management service 410, and may automatically perform disablement actions if the ten gigabyte limit is reached (which may deprive the user of user device 400 of continued use of the database services, which may not be desired).

Once implemented, managed system 420 may, at block 438, send a notification to subscription management service 410 indicating the database services are being provided to the user. While not shown, in FIG. 4A, the user may begin to use the database services which may cause data to begin to be stored in managed system 420.

In response to the notification, subscription management service 410 may implement use monitoring for managed system 420. To do so, subscription management service 410 may, in block 442, send a reporting configuration for managed system 420 which may define when use data is to be reported to subscription management service 410.

In response, at block 444, managed system 420 may implement use data reporting. Consequently, in block 446, managed system may begin reporting use data to subscription management service 410. Accordingly, as the quantity of information in the database grows, subscription management service 410 may be able to ascertain whether the ten gigabyte subscription limit will be reached.

However, to more accurately make the determination, subscription management service 410 may, at block 448, perform an inference generation to ascertain the future use level of managed system. The inference generation may utilize, as input, the user data of block 446 and the effective use capacity for the user derived from the subscription updates/requests. The inference generation indicates that, in the future, the user will use eleven gigabytes of storage but, by that time, the effective use capacity will be twenty gigabytes. Consequently, the inference generation does not indicate that the user will reach its subscription limit of ten gigabytes in the future. Turning to FIG. 4B, accordingly, at block 450, subscription management service 410 reports to user device 400 (and corresponding user) that no subscription changes are warranted.

As use of the database services by user continues, the quantity of stored data increases to eight gigabytes. Managed system 420, at block 452, reports use data to subscription management service 410 indicating the eight gigabytes of use of the ten gigabyte subscription limitation.

To accurately determine whether it is likely that a subscription limitation will be reached, subscription management service 410 may, at block 454, perform an inference generation to ascertain the future use level of managed system 420. The inference generation may utilize, as input, the eight gigabytes of use indicated in block 452 and the effective use capacity for the user derived from the subscription updates/requests. The inference generation indicates that, in the future, the user will use twenty-two gigabytes of storage and the effective use capacity will be twenty gigabytes.

Consequently, the inference generation indicates that the user will reach its subscription limit of ten gigabytes in the future. Accordingly, at block 456, subscription management service 410 reports to user device 400 (and corresponding user) that a subscription change of expanding the subscription to fifteen gigabytes of storage is warranted. For example, the user may, in block 458 and via user device 400, make a subscription election prompted by subscription management service 410 to expand its subscription.

In response, at block 460, user through user device 400 consents to the subscription expansion and sends a corresponding subscription update request to subscription management service 410. In response, at block 462, subscription management service 410 generates and sends a subscription update to cause managed system 420 to operate in accordance with the updated subscription. Additionally, subscription management service 410 updates its repository and calculates effective use capacity for the user for managed system 420.

After doing so, at block 464, managed system 420 again reports use data of eight gigabytes of storage space being used by the user.

To accurately determine whether it is likely that a subscription limitation will be reached, at block 466, subscription management service 410 performs an inference generation to ascertain the future use level of managed system 420. The inference generation may utilize, as input, the eight gigabytes of use indicated in block 464 and the effective use capacity for the user derived from the subscription updates/requests (in particular, subscription update of block 462). The inference generation indicates that, in the future, the user will use twenty-two gigabytes of storage and the effective use capacity will be thirty-five gigabytes.

Consequently, the inference generation indicates that the user will not reach its subscription limit of fifteen gigabytes in the future. Accordingly, at block 468, subscription management service 410 reports to user device 400 that no subscription changes are warranted.

Thus, as seen in FIGS. 4A-4B, managed systems may be managed in a distributed system in a manner that increases that likelihood of desired computer implemented services being provided to users over time.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

Further, proactively identify likely points in time when subscription limits will be reached, users may be empowered to make proactive choices to avoid loss of services. For example, taking into account both use of managed systems by a user and a user's historical record of dynamic changes in subscription, the distributed system may be less likely to suggest that (additional or fewer) subscription changes are warranted to avoid loss of access to desired computer implemented services.

As discussed above, various components may be implemented with computing devices. For example, any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing a distributed system comprising managed systems and a subscription manager that manages operation of the managed systems, the method comprising, by the subscription manager:
    obtaining use data and subscription changes for a first period of time, the use data reflecting use of a managed system of the managed systems by a user that is subscribed to use the managed system during the first period of time and the subscription changes reflecting changes in subscriptions to the managed system for the user during the first period of time;
    obtaining, using the use data, the subscription changes, and an inference model, a future use level of the managed system for a second period of time after the first period of time by, at least:
        generating a first prediction of future use of the managed system by the user during the second period of time;
        generating a second prediction of a future subscription limitation, the future subscription limitation being a prediction of a modification to the subscription limitation that will occur prior to the second period of time, the future use level being obtained using the first prediction and the second prediction; and
    making a determination that a subscription limitation for the user will be reached during the second period of time based on determining that the future use of the managed system will exceed the future subscription limitation during the second period of time; and
    in response to the determination, performing, prior to the second period of time, an action set to reduce a likelihood that the subscription limitation will be reached during the second period of time in order to provide computer implemented services to the user during the second period of time that fall within a limit of the subscriptions for the user.

2. The computer-implemented method of claim 1, wherein the action set comprises:
    presenting a subscription modification to the user, the subscription modification being based on the future use level;
    obtaining consent from the user for the presented subscription modification; and
    updating operation of the managed system based on the subscription modification,
    the computer implemented services being provided using updated functionality of the managed system.

3. The computer-implemented method of claim 2, wherein the updated functionality comprises automatic disablement of use of the computer implemented services by the user based on the subscription modification.

4. The computer-implemented method of claim 3, wherein the subscription modification indicates that the user is authorized to utilize more resources of the managed system than was authorized to utilize during the first period of time.

5. The computer-implemented method of claim 1, wherein the future subscription limitation indicates that the user will be authorized to utilize more resources of the managed system than was authorized to utilize during the first period of time but less than indicated by the future use of the managed system.

6. The computer-implemented method of claim 1, wherein the inference model comprises a machine learning model.

7. The computer-implemented method of claim 6, wherein the machine learning model is based on a Bayesian neural network.

8. The computer-implemented method of claim 1, wherein the use data is obtained from an out-of-band management controller hosted by the managed system, the out-of-band management controller managing functionality of the managed system accessible by the user and being tasked with implementing at least a portion of the action set.

9. The computer-implemented method of claim 8, wherein the out-of-band management controller operates independently from the managed system.

10. The computer-implemented method of claim 9, wherein the subscription changes are automatically implemented by the out-of-band management controller by perform at least one of:
    disabling an enabled hardware component of the managed system;
    enabling a disabled hardware component of the managed system; and
    implementing a different software stack on the managed system.

11. A non-transitory machine-readable medium having instructions stored therein, which when executed by a processor, cause the processor to perform operations for managing a distributed system comprising managed systems and a subscription manager that manages operation of the managed systems, the operations comprising, by the subscription manager:
    obtaining use data and subscription changes for a first period of time, the use data reflecting use of a managed system of the managed systems by a user that is subscribed to use the managed system during the first period of time and the subscription changes reflecting changes in subscriptions to the managed system for the user during the first period of time;
    obtaining, using the use data, the subscription changes, and an inference model, a future use level of the managed system for a second period of time after the first period of time by, at least:
  generating a first prediction of future use of the managed system by the user during the second period of time;
  generating a second prediction of a future subscription limitation, the future subscription limitation being a prediction of a modification to the subscription limitation that will occur prior to the second period of time, the future use level being obtained using the first prediction and the second prediction; and
making a determination that a subscription limitation for the user will be reached during the second period of time based on determining that the future use of the managed system will exceed the future subscription limitation during the second period of time; and
in response to the determination, performing, prior to the second period of time, an action set to reduce a likelihood that the subscription limitation will be reached during the second period of time in order to provide computer implemented services to the user during the second period of time that fall within a limit of the subscriptions for the user.

12. The non-transitory machine-readable medium of claim 11, wherein the action set comprises:
  presenting a subscription modification to the user, the subscription modification being based on the future use level;
  obtaining consent from the user for the presented subscription modification; and
  updating operation of the managed system based on the subscription modification,
  the computer implemented services being provided using updated functionality of the managed system.

13. The non-transitory machine-readable medium of claim 11, wherein the use data is obtained from an out-of-band management controller hosted by the managed system, the out-of-band management controller managing functionality of the managed system accessible by the user and being tasked with implementing at least a portion of the action set.

14. The non-transitory machine-readable medium of claim 13, wherein the out-of-band management controller operates independently from the managed system.

15. The non-transitory machine-readable medium of claim 14, wherein the subscription changes are automatically implemented by the out-of-band management controller by perform at least one of:
  disabling an enabled hardware component of the managed system;
  enabling a disabled hardware component of the managed system; and
  implementing a different software stack on the managed system.

16. A data processing system, comprising:
a memory; and
a processor adapted to perform operations for managing a distributed system comprising managed systems and a subscription manager that manages operation of the managed systems, the data processing system being the subscription manager and the operations comprising:
  obtaining use data and subscription changes for a first period of time, the use data reflecting use of a managed system of the managed systems by a user that is subscribed to use the managed system during the first period of time and the subscription changes reflecting changes in subscriptions to the managed system for the user during the first period of time;
  obtaining, using the use data, the subscription changes, and an inference model, a future use level of the managed system for a second period of time after the first period of time by, at least:
    generating a first prediction of future use of the managed system by the user during the second period of time;
    generating a second prediction of a future subscription limitation, the future subscription limitation being a prediction of a modification to the subscription limitation that will occur prior to the second period of time, the future use level being obtained using the first prediction and the second prediction; and;
  making a determination that a subscription limitation for the user will be reached during the second period of time based on determining that the future use of the managed system will exceed the future subscription limitation during the second period of time; and
  in response to the determination, performing, prior to the second period of time, an action set to reduce a likelihood that the subscription limitation will be reached during the second period of time in order to provide computer implemented services to the user during the second period of time that fall within a limit of the subscriptions for the user.

17. The data processing system of claim 16, wherein the action set comprises:
  presenting a subscription modification to the user, the subscription modification being based on the future use level;
  obtaining consent from the user for the presented subscription modification; and
  updating operation of the managed system based on the subscription modification,
  the computer implemented services being provided using updated functionality of the managed system.

18. The data processing system of claim 16, wherein the use data is obtained from an out-of-band management controller hosted by the managed system, the out-of-band management controller managing functionality of the managed system accessible by the user and being tasked with implementing at least a portion of the action set.

19. The data processing system of claim 18, wherein the out-of-band management controller operates independently from the managed system.

20. The data processing system of claim 19, wherein the subscription changes are automatically implemented by the out-of-band management controller by perform at least one of:
  disabling an enabled hardware component of the managed system;
  enabling a disabled hardware component of the managed system; and
  implementing a different software stack on the managed system.

* * * * *